United States Patent [19]

Sheppard

[11] 4,337,688

[45] Jul. 6, 1982

[54] POWER STEERING GEAR WITH ADJUSTABLE VALVE POSITIONING PIN

[76] Inventor: Peter H. Sheppard, R. H. Sheppard Co., Inc., Hanover, Pa. 17331

[21] Appl. No.: 97,388

[22] Filed: Nov. 26, 1979

[51] Int. Cl.$^3$ .................... F15B 9/10; F16K 31/50
[52] U.S. Cl. .................................. 91/422; 91/378; 251/270; 137/625.69
[58] Field of Search ............ 251/274, 270, 252, 222; 92/165 PR; 151/24; 85/1 P, 1 SS; 91/378

[56] References Cited

U.S. PATENT DOCUMENTS

| | | | |
|---|---|---|---|
| 1,423,178 | 7/1922 | Brabson | 251/270 |
| 1,778,865 | 10/1930 | Moseley | 251/270 |
| 2,179,165 | 11/1939 | Sifkovitz | 251/252 |
| 2,532,815 | 12/1950 | Kindsvatter | 85/1 P |
| 4,088,063 | 5/1978 | Sheppard | 92/136 |

Primary Examiner—Paul E. Maslousky
Attorney, Agent, or Firm—Lowe, King, Price & Becker

[57] ABSTRACT

An adjustable guide pin arrangement for an integral power steering gear is provided. A reciprocating valve is provided within the piston of the gear to selectively distribute pressurized fluid to the end of the piston for steering action. An input shaft engages the valve to move the valve providing the input signal. An output pinion engages the piston along the side. The guide pin is mounted in the piston and has two pairs of tapered flat guide surfaces at its distal end. One pair of guide surfaces engages a corresponding tapered slot in the valve for each adjusted position. Screw threads are provided to adjustably move the pin inward for less clearance and outwart for more clearance between the guide surfaces and the sides of the slot. The taper of the distal end of the pin is approximately 2°-2½°. Each quarter turn preferably provides a differential clearance of approximately 0.001 inch. A tool-engaging slot on the head of the pin provides for easy visual adjustment during assembly.

8 Claims, 4 Drawing Figures

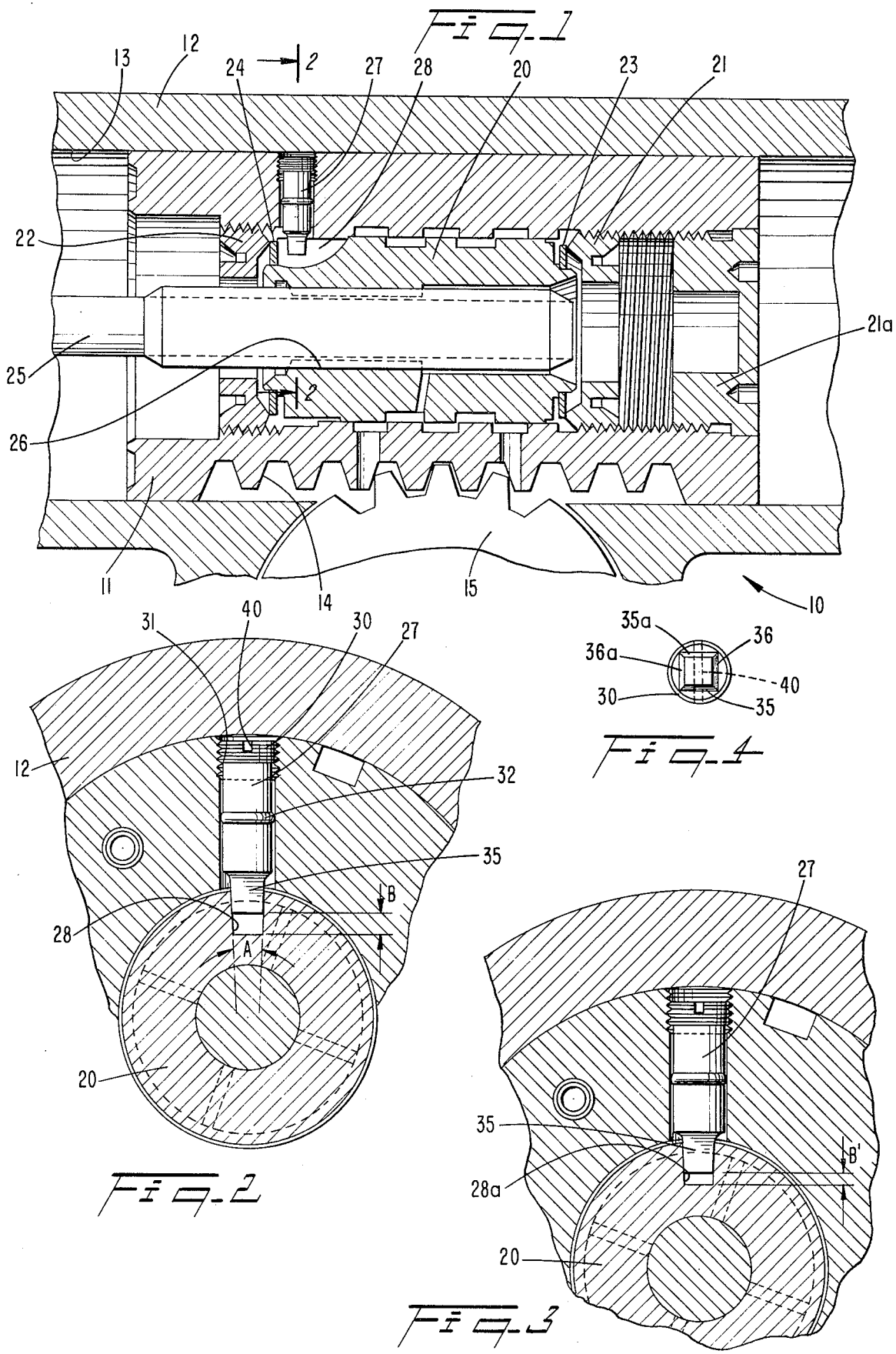

4,337,688

POWER STEERING GEAR WITH ADJUSTABLE VALVE POSITIONING PIN

FIELD OF THE INVENTION

The present invention relates to integral power steering gears, and more particularly, to a power steering gear with an improved valve guide concept providing improved operating efficiency and improved ease of assembly.

BACKGROUND OF THE INVENTION

A successful improved design of the basic power steering gear with the distributing valve in the piston was invented several years ago and is shown in the R. H. Sheppard U.S. Pat. No. 4,088,063, issued May 9, 1978. This improved design provides a reduced size and weight power steering gear to meet the ever increasing demands for efficiency among automotive manufacturers, and more specifically, among truck manufacturers using the Sheppard Power Steering System. The new design includes not only the space and weight-saving features but also new lubricating features providing for substantial increases in operation efficiency. In achieving the improved operation, the new gear also provided for greater manufacturing efficiency.

One feature that provided for greater operation efficiency in this earlier design was the concept of positioning the valve more in the center of the piston and providing the valve guide slot at the end of the valve adjacent the threads that engage the input shaft. Further, the slot is substantially aligned opposite the output rack so that deflection forces within the piston under heavy steering loads do not adversely affect the ability of the valve to reciprocate. This reciprocal valve movement or reversibility of the valve is one of the major parameters in gauging the efficient operation of a power steering gear. The Sheppard gear has historically excelled in this area of power steering operation. Essentially, the reposition of the valve guide slot and the better lubrication provided much better reversibility than had heretofore been attainable.

In the prior design, the guide pin included one pair of flattened, parallel guide surfaces to engage the sides of the groove. The flattened surfaces are straight with respect to the line of travel of the valve, and thus allow the valve to reciprocate but not rotate. With the proper guide pin fit, no more than approximately 0.001 inch clearance is desired.

However, even with the improvement made in the 4,088,063 patent, there was still something left to be desired, especially when the valve within the piston is hardened. It was found that in a significant number of valves after heat treating, the desired fit was not readily obtained. An inordinate amount of time was spend during the manufacturing process to handfit the guide pins to the particular valve to give best results. To compound the problem, it was found that it could not be predicted whether the slot in the valve would "grow" or "shrink" when the heat treatment was applied. Because of this, the slot could not simply be made either larger or smaller depending on the desired final size of the slot desired.

The thing that appeared to be necessary was to devise a way of adjusting the fit of the pin in the slot of the valve so that any manufactured pin could fit any valve. With such an arrangement, regardless of whether the valve slot has changed during heat treatment would not matter, since with an adjustment in the final assembly the desired tolerance could be obtained. However, insofar as I'm aware, prior to the present invention, there was not such successful adjusting means available.

OBJECTIVES OF THE INVENTION

Thus, it is one object of the present invention to provide a power steering system having an operative adjusting arrangement for the valve guide means.

It is another object of the present invention to provide a power steering gear with a valve in the piston wherein an effective adjustment is provided for a valve guide pin fitting within a valve guide slot of the valve.

It is another and more specific object of the present invention to provide a guide pin having tapered guide surfaces to fit within a correspondingly tapered slot, which pin during assembly can be moved either in or out to provide the exact mating position required for the best reversibility of the valve.

It is still another object of the present invention to provide a steering gear, as described, exhibiting the increased operating efficiency with superior reversibility (change or beginning of movement) of the valve within the piston while at the same time substantially decreasing the cost of manufacture of the steering gear.

Another more specific related object of the present invention is to provide a guide pin for a valve within the piston that has (1) tapered guide surfaces to allow optimum positioning with respect to the valve slot, and (2) provide two pairs of guide surfaces or sides that may effectively mate with the slot for closer adjustment.

It is still another and related object of the present invention to provide an improved arrangement for guiding the valve within the piston in which a simple screw adjustment provides the necessary movement of the pin relative to the slot for optimum clearance between the parts for optimum reversibility.

BRIEF DESCRIPTION OF THE DRAWINGS

FIG. 1 is a cross-sectional view taken along the longitudinal axis of the power steering gear showing the new valve positioning pin in place;

FIG. 2 is an enlarged partial crosssectional view taken along line 2—2 showing the relationship of the valve positioning pin as adjusted for engagement with a relatively narrow guide slot in the valve;

FIG. 3 is an enlarged partial crosssectional view, also taken along line 2—2 of FIG. 1, except with the valve positioning pin adjusted inwardly one full turn to fit a relatively wide guide slot; and FIG. 4 is an end view of the positioning pin showing the two pairs of tapered guide surfaces.

DETAILED DESCRIPTION OF A PREFERRED EMBODIMENT

Reference should now be made to FIG. 1 of the drawings for more complete understanding of the nature of the present invention. A steering gear 10 comprises an operating piston 11 mounted in a gear housing 12 that forms the cylinder 13 in which the piston reciprocates longitudinally for providing the steering output. The output is translated through a rack 14 on one side of the piston to an output pinion 15 (partially shown in FIG. 1). As will be understood by reference to the previous Sheppard U.S. Pat. No. 4,088,063, the output pinion operates an output shaft which in turn is connected to the steering linkage of the vehicle, such as a truck.

A reciprocating spool-type distributing valve 20 is mounted substantially within the center of the piston 10 and almost directly over the output gear 16. Threaded retaining rings 21, 22 at opposite ends of the valve 20 center the valve between calibrated washer springs 23, 24. The rings 21, 22 are locked in position by the pins (not shown) and the cylinder head end of the piston is closed by piston end cap 21a.

Input shaft 25 is threaded and threadedly engages the valve 20 along the threads 26, which is the end of the valve 20 closest to the bearing cap end of the gear. The valve 20 is stabilized and substantially free from deflection forces that are caused by very high torquing during dynamic operation of the gear.

In order to limit the movement of the valve 20 to a reciprocating motion, a guide pin 27, constructed in accordance with the principles of the present invention, is provided in the piston along the side of the piston generally opposite the output gear 15. With the pin 27 positioned opposite the output gear 15, the deflection caused by the interaction of the teeth on the gear and the rack 14 causes no significant binding in its operation. The guide pin 27 performs an essential function since if it was not present the turning of the output shaft 25 would have a tendency to simply rotate the valve 20. By preventing rotation, the valve is reciprocated longitudinally by the threaded engagement so that the peripheral grooves open and close, sending the high pressure fluid to one end and exhausting the other end of the cylinder. As a valve 20 reciprocates, the flattened guide surfaces of the pin 27, to be described in detail below, slide along the sides of groove 28 in the end of the valve adjacent the bearing cap end.

The details of the valve positioning pin 27 can best be seen by viewing FIGS. 2 and 4 of the drawings. The head 30 of the pin is threaded so as to engage a threaded aperture 31 in the side of the piston 11. The body of the pin is provided with a groove about halfway down in which a sealing O-ring 32 is positioned. The O-ring seals the high pressure fluid around the pin and prevents leaking to the outer periphery of the piston 11.

At the distal end, that is the end of the pin 27 remote from the head 30, there are four flattened guide surfaces or sides 35, 35a, and 36, 36a, as best shown in FIG. 4. The sides 35, 35a form a first pair of guide surfaces for the guide slot 28, and when the pin is turned through 90 degrees, a second pair of guide surfaces 36, 36a are formed to engage the operative guide surfaces for the slot 28.

The guide surfaces 35, 35a, 36, 36a are slanted along the longitudinal axis of the pin so that the distal end of the pin is tapered, as best shown in FIG. 2. This taper is preferably between 2 degrees and 2½ degrees (2°-2½°) included angle, as shown by the angle A in FIG. 2. The preferred embodiment of taper is 2 degrees, 18 minutes (2°, 18″) included angle.

The two pairs of guide surfaces 35, 35a and 36, 36a exactly mate with the corresponding sides of the guide slot 28. In other words, the sides of the slot 28 are tapered with the same angle in the range of 2 degrees to 2½ degrees (2°-2½°) included angle with the preferred embodiment being 2 degrees, 18 minutes (2°, 18″).

During assembly of the valve 20 in the piston 11, the adjustment of the pin 27 is made, in accordance with the present invention, in order to give the desired close fit (within 0.001 inch) between the parts. First, after heat treatment, the slot 28 may be precisely measured by an inside micrometer. The width of the slot 28 then determines the initial adjusted position of the pin 27 within the piston 11. For example, if the width of the slot 28 is the minimum within the range of acceptable tolerance for the slot, the pin 27 is positioned as shown in FIG. 2, with guide surfaces 36, 36a engaging the sides of slot 28. That is, the slot 28 is relatively narrow and accordingly the pin 27 is positioned at its maximum outward position along the radius of the valve and piston (FIG. 2). This adjusted position would leave a space B as shown in this FIG. 2. Because the distal or operative end of the pin 27 is in this uppermost position, the portion of the pin engaging the slot 28 is narrow and thus the desired close fit within about 0.001 inch with the relatively narrow slot 28 is attained.

In the other extreme, where the slot 28a has enlarged during heat treatment for example, the pin 27 is positioned one full revolution inwardly so as to be in the position shown in FIG. 3. Just as in the embodiment of FIG. 2, the guide surfaces 36, 36a are the surfaces on the end of the pin that are engaging the sides of the groove 28a. Since the pin has the 2°-2½° taper, it is further down in the slot and therefore accommodates the wider slot 28a. As shown in FIG. 3, the space remaining at the bottom of the slot 28a is B.

In between these two exemplary adjustment cases, the positioning pin 27 of the present invention allows three additional adjustments. Thus, in the cases where the slot 28, 28a does not fall within either of the two extremes, the close fit can still be obtained. This is accomplished by simply rotating the pin 27 through selected 90 degree movements until the proper match is attained. With each 90 degree movement from the position shown in FIG. 2 to the position shown in FIG. 3, increments of adjustment are attained so that the desired 0.001 inch approximate clearance can be closely maintained. The pitch of the threads 31 are advantageously selected to give approximately 0.001 inch change with each quarter turn of the pin 27. Practice has shown that this range of adjustments gives excellent results in manufacturing of the Sheppard power steering gear.

Of course, in accordance with the invention, still further movement of the pin 27, for example, through another complete revolution, is possible if necessary or desired. The range of possible adjustment is thus capable of being extended to cover approximately 0.008 inch in the embodiment shown (two revolutions of pin 27).

The head of the pin 27 is provided with a tool engaging slot 40. This slot may be engaged by a suitable screwdriver for adjusting the pin 27 at one of the selected positions. The slot advantageously extends parallel to the guide surfaces 36, 36a (see FIGS. 2 and 4). This orientation allows the assembly person to align the guide surfaces from viewing the head of the pin 27.

Because the guide surfaces 35, 35a and 36, 36a are flat, and the area is well lubricated by the hydraulic fluid within the power steering system, there is negligible wear between the parts and the original adjustment is maintained for the life of the steering gear. The pin cannot become displaced and needs no separate anchoring since the groove 28 prevents the pin 27 from rotating and the screw threads prevent radial movement.

If closer adjustment is desired a third pair of guide surfaces could be provided so that the operative end of the pin is hexagonal. However, this reduces the surface area of the guide surfaces and increases the possibility of wear. Also, the pin having less guide surface area has a greater tendency to turn during operation as the pin gets closer to being round. This undesirable result would allow the adjustment of the pin to be disturbed.

The results and advantages of the valve positioning pin of the present invention should now be apparent. The pin 27 allows easier manufacturing since there is less need to hold close machining tolerances and there is less concern regarding the effects of heat treatment on the valve guide slot 28. By merely turning the guide pin 27 to one of five positions, as described, or more if desired, the necessary close fit between the pairs of guide surfaces 35, 35a, 36, 36a and the sides of the slot 28 is readily attainable. The taper, represented by the angle A, and the pitch of the threads 31, is selected to give the optimum adjustment while maintaining the close control in the clearance between the two parts. The reversibility of the valve 20 is enhanced since substantially a perfect fit is obtained with each steering gear. The proces of manufacturing is improved since the tedious function of individually matching parts is no longer necessary. The adjustment of the pin 27 is a simple assembly procedure, especially with the tool engaging slot 40 serving as a convenient indicator of the position of the guide surfaces 35, 35a and 36, 36a.

In this disclosure there is shown and described only the preferred embodiment of the invention but, as aforementioned, it is to be understood that the invention is capable of other and different combinations and environments, and is capable of changes or modifications within the scope of the inventive concept as expressed herein.

I claim:

1. An integral power steering gear having a reciprocating power piston in a cylinder, a valve within the piston to selectively distribute pressurized fluid to a first and second end of the piston within the cylinder for steering action, a steering input shaft operatively engaging the valve, an output means in engagement with said piston, the improvement comprising valve guide means including a pin having side guide surfaces and extending between said piston and said valve to allow relative reciprocating action but not rotation, and means including the side guide surfaces of said pin to vary selectively a lateral clearance of said guide means relative to said valve to provide optimum clearance, whereby to gain maximum reversibility of the valve within the piston and improved ease of manufacture.

2. An integral power steering gear having a reciprocating power piston in a cylinder, a valve within the piston to selectively distribute pressurized fluid to a first and second end of the piston within the cylinder for steering action, a steering input shaft operatively engaging the valve, an output means in engagement with said piston, the improvement comprising valve guide means extending between said piston and said valve to allow relative reciprocating action but not rotation, and means to vary selectively the operative relationship of said guide means relative to said valve to provide optimum clearance, said guide means comprising a pin having a head and distal end remote from the head mounted radially in the piston, said pin having tapered flat guide surfaces at its distal end, and a corresponding tapered slot in the valve to receive said pin, whereby to gain maximum reversibility of the valve within the piston and improved ease of manufacture.

3. The power steering gear of claim 2 wherein said adjusting means comprises a screw thread adjacent the head of said pin and corresponding screw threads in said piston, the tapered, flat guide surfaces of the pin and the slot mating with less clearance as the screw is turned inwardly toward said valve and with more clearance as the screw is turned outwardly away from said valve during adjustment.

4. The power steering gear of claim 3 wherein the taper of the pin and the slot is approximately 2°–2½° measured as an included angle.

5. An integral power steering gear having a reciprocating power piston in a cylinder, a valve within the piston to selectively distribute pressurized fluid to a first and second end of the piston within the cylinder for steering action, a steering input shaft operatively engaging the valve, an output means in engagement with said piston, the improvement comprising valve guide means extending between said piston and said valve to allow relative reciprocating action but not rotation, said guide means comprising a pin having a head and distal end remote from the head mounted radially in the piston, said pin having tapered flat guide surfaces at its distal end, and a corresponding tapered slot in the valve to receive said pin, and means to adjust said guide means to provide optimum clearance, said adjusting means comprising a screw thread adjacent the head of said pin and corresponding screw threads in said piston, the tapered, flat guide surfaces of the pin and the slot mating with less clearance as the screw is turned inwardly toward said valve and with more clearance as the screw is turned outwardly away from said valve during adjustment, the taper of the pin and the slot being approximately 2°–2½° measured as an included angle, said pin including at least two pairs of tapered flat surfaces, the tapered flat surfaces being displaced by 90° with respect to each other, whereby each quarter-turn of the screw provides a new adjusting relationship, whereby to gain maximum reversibility of the valve within the piston and improved ease of manufacture.

6. The power steering gear of claim 5, wherein the pitch of the thread provides a difference in clearance of approximately 0.001 inch for each quarter turn.

7. The power steering gear of claim 5 wherein is provided a tool receiving slot on said head, said slot being parallel to one set of tapered flat surfaces and perpendicular to the other set to provide ease of visual adjustment.

8. An integral power steering gear having a reciprocating power piston in a cylinder, a valve within the piston to selectively distribute pressurized fluid to a first and second end of the piston within the cylinder for steering action, a steering input shaft operatively engaging the valve, an output means in engagement with said piston, the improvement comprising valve guide means extending between said piston and said valve to allow relative reciprocating action but not rotation, said guide means comprising a pin having a head and distal end remote from the head mounted radially in the piston, said pin having tapered flat guide surfaces at its distal end, and a corresponding tapered slot in the valve to receive said pin, and means to adjust said guide means to provide optimum clearance, said adjusting means comprising a screw thread adjacent the head of said pin and corresponding screw threads in said piston, the tapered, flat guide surfaces of the pin and the slot mating with less clearance as the screw is turned inwardly toward said valve and with more clearance as the screw is turned outwardly away from said valve during adjustment, and an O-ring on said pin positioned between said head and said distal end to seal the high pressure fluid in the valve area, whereby to gain maximum reversibility of the valve within the piston and improved ease of manufacture.

* * * * *